(12) United States Patent
Konicek

(10) Patent No.: US 7,859,526 B2
(45) Date of Patent: Dec. 28, 2010

(54) ACTIVE MATRIX EMISSIVE DISPLAY AND OPTICAL SCANNER SYSTEM, METHODS AND APPLICATIONS

(76) Inventor: Jeffrey C. Konicek, 403 Bourne St., Tolono, IL (US) 61880-9430

( * ) Notice: Subject to any disclaimer, the term of this patent is extended or adjusted under 35 U.S.C. 154(b) by 792 days.

(21) Appl. No.: 11/796,343

(22) Filed: Apr. 27, 2007

(65) Prior Publication Data

US 2007/0252005 A1 Nov. 1, 2007

Related U.S. Application Data

(60) Provisional application No. 60/797,015, filed on May 1, 2006.

(51) Int. Cl.
G09G 5/00 (2006.01)
(52) U.S. Cl. .................. 345/207; 345/204; 345/156
(58) Field of Classification Search .............. 345/1.1, 345/1.3, 207, 204, 156, 418, 8, 619, 419, 345/626, 634, 213, 46, 82, 75.1; 235/462.42, 235/435, 380, 462.01, 462.13; 348/383; 362/613
See application file for complete search history.

(56) References Cited

U.S. PATENT DOCUMENTS

| | | | |
|---|---|---|---|
| 3,668,313 A | 6/1972 | Dym | |
| 4,224,615 A | 9/1980 | Penz | |
| 4,363,029 A | 12/1982 | Piliavin et al. | |
| 4,476,463 A | 10/1984 | Ng et al. | |
| 4,707,845 A | 11/1987 | Krein et al. | |
| 4,733,222 A | 3/1988 | Evans | |
| 4,841,290 A | 6/1989 | Nakano et al. | |
| 4,853,498 A | 8/1989 | Meadows et al. | |
| 4,922,061 A | 5/1990 | Meadows et al. | |
| 4,972,252 A | 11/1990 | Maekawa | |

(Continued)

FOREIGN PATENT DOCUMENTS

EP 0942583 9/1999

(Continued)

OTHER PUBLICATIONS

Kalinowski, "Organic Light-Emitting Diodes: Principles, Characteristics and Processes," CRC, Nov. 2004.

(Continued)

*Primary Examiner*—Prabodh M Dharia
(74) *Attorney, Agent, or Firm*—Steven G. Lisa, Ltd.; James David Busch; Douglas W. Rudy

(57) ABSTRACT

An active matrix emissive display (ED) is disclosed that also includes optical scanning capability. Each display pixel is independently addressable and independently internally driven for light generation. Each display pixel is also given the ability to be coupled to detection circuitry in order to sense currents or voltages that are optically generated or leaked by its internal LED when exposed to light (and thus acting in a photodiode capacity). Since the intensity of the light illuminating the diode determines the magnitude of generated currents and/or voltages or leakage current through the diode (when reverse biased), these sensed currents or voltages give an indication of the intensity of the light striking the pixel. In this manner, active matrix ED pixels are configured to serve the dual purpose of being able to generate and detect light.

20 Claims, 7 Drawing Sheets

U.S. PATENT DOCUMENTS

| | | | |
|---|---|---|---|
| 5,043,710 A | 8/1991 | Rydel | |
| 5,124,695 A | 6/1992 | Green | |
| 5,194,862 A | 3/1993 | Edwards | |
| 5,204,659 A | 4/1993 | Sarma | |
| 5,331,149 A | 7/1994 | Spitzer | |
| 5,446,564 A | 8/1995 | Mawatari et al. | |
| 5,598,474 A * | 1/1997 | Johnson | 713/186 |
| 5,708,460 A | 1/1998 | Young et al. | |
| 5,717,321 A | 2/1998 | Kerth et al. | |
| 5,751,276 A | 5/1998 | Shih | |
| 5,777,596 A | 7/1998 | Herbert | |
| 5,861,583 A | 1/1999 | Schediwy et al. | |
| 5,886,687 A | 3/1999 | Gibson | |
| 5,929,845 A | 7/1999 | Wei et al. | |
| 6,016,140 A | 1/2000 | Blouin et al. | |
| 6,028,581 A | 2/2000 | Umeya | |
| 6,040,810 A | 3/2000 | Nisimura | |
| 6,115,017 A | 9/2000 | Mikami et al. | |
| 6,133,906 A | 10/2000 | Geaghan | |
| 6,144,165 A | 11/2000 | Lindenbaum | |
| 6,163,313 A | 12/2000 | Aroyan et al. | |
| 6,172,667 B1 | 1/2001 | Sayag | |
| 6,204,897 B1 | 3/2001 | Colgan et al. | |
| 6,239,788 B1 | 5/2001 | Nohno et al. | |
| 6,246,394 B1 | 6/2001 | Kalthoff et al. | |
| 6,369,685 B1 | 4/2002 | Milavec et al. | |
| 6,372,534 B1 | 4/2002 | den Boer et al. | |
| 6,400,359 B1 | 6/2002 | Katabami | |
| 6,404,137 B1 | 6/2002 | Shodo | |
| 6,411,344 B2 | 6/2002 | Fujii et al. | |
| 6,424,094 B1 | 7/2002 | Feldman | |
| 6,480,305 B1 | 11/2002 | Resman | |
| 6,489,619 B2 | 12/2002 | Street | |
| 6,506,983 B1 | 1/2003 | Babb et al. | |
| 6,512,512 B1 | 1/2003 | Blanchard | |
| 6,559,433 B1 | 5/2003 | Ozawa | |
| 6,559,835 B1 | 5/2003 | Randall | |
| 6,611,241 B1 * | 8/2003 | Firester et al. | 345/1.3 |
| 6,624,835 B2 | 9/2003 | Willig | |
| 6,741,237 B1 | 5/2004 | Benard et al. | |
| 6,781,579 B2 | 8/2004 | Huang et al. | |
| 6,819,311 B2 | 11/2004 | Nose et al. | |
| 6,819,316 B2 | 11/2004 | Schulz et al. | |
| 6,825,833 B2 | 11/2004 | Mulligan et al. | |
| 6,831,710 B2 | 12/2004 | den Boer | |
| 6,841,225 B2 | 1/2005 | Bottari | |
| 6,841,642 B2 | 1/2005 | Kaszas | |
| 6,885,157 B1 | 4/2005 | Cok et al. | |
| 6,930,658 B2 | 8/2005 | Lee | |
| 6,947,102 B2 | 9/2005 | den Boer et al. | |
| 6,956,553 B2 | 10/2005 | Tsutsui et al. | |
| 6,956,632 B2 | 10/2005 | Ozawa et al. | |
| 6,961,015 B2 | 11/2005 | Kernahan et al. | |
| 6,961,104 B2 | 11/2005 | Baek | |
| 6,977,646 B1 | 12/2005 | Hauck et al. | |
| 6,992,317 B2 | 1/2006 | Jain et al. | |
| 7,009,663 B2 | 3/2006 | Ablicah et al. | |
| 7,030,551 B2 | 4/2006 | Yamazaki et al. | |
| 7,042,548 B2 | 5/2006 | Zhang | |
| 7,129,938 B2 * | 10/2006 | Naugler, Jr. | 345/207 |
| 7,393,128 B2 * | 7/2008 | Sakai et al. | 362/613 |
| 7,453,217 B2 * | 11/2008 | Lys et al. | 315/291 |
| 7,466,348 B2 * | 12/2008 | Morikawa et al. | 348/231.3 |
| 2001/0043166 A1 * | 11/2001 | Jacobsen et al. | 345/27 |
| 2003/0007135 A1 | 1/2003 | Sciammarella et al. | 353/98 |
| 2003/0067447 A1 | 4/2003 | Geaghan et al. | |
| 2003/0122749 A1 | 7/2003 | Booth et al. | |
| 2004/0095360 A1 * | 5/2004 | Tseng et al. | 345/619 |
| 2004/0095617 A1 * | 5/2004 | Mangerson | 358/484 |
| 2004/0140964 A1 * | 7/2004 | Wang et al. | 345/179 |
| 2004/0153649 A1 * | 8/2004 | Rhoads et al. | 713/176 |
| 2004/0155991 A1 | 8/2004 | Lowles et al. | |
| 2004/0227743 A1 | 11/2004 | Brown | |
| 2005/0006656 A1 | 1/2005 | Jain et al. | |
| 2005/0199876 A1 | 9/2005 | Matsumoto | |
| 2005/0231656 A1 | 10/2005 | den Boer et al. | |
| 2006/0007222 A1 | 1/2006 | Uy | |
| 2006/0012575 A1 | 1/2006 | Knapp et al. | |
| 2006/0081706 A1 * | 4/2006 | Onischuk | 235/386 |
| 2006/0087849 A1 * | 4/2006 | Marra et al. | 362/307 |
| 2006/0132716 A1 * | 6/2006 | Peeters et al. | 353/29 |
| 2006/0262100 A1 | 11/2006 | Van Berkel | |
| 2007/0062739 A1 | 3/2007 | Philipp et al. | |
| 2007/0085157 A1 * | 4/2007 | Fadell et al. | 257/428 |
| 2007/0120763 A1 * | 5/2007 | De Paepe et al. | 345/1.3 |
| 2008/0105748 A1 * | 5/2008 | Lei | 235/462.42 |
| 2008/0158144 A1 * | 7/2008 | Schobben et al. | 345/156 |
| 2009/0320106 A1 * | 12/2009 | Jones et al. | 726/5 |

FOREIGN PATENT DOCUMENTS

| | | |
|---|---|---|
| JP | 10090655 | 4/1998 |
| WO | WO2006004981 | 1/2006 |

OTHER PUBLICATIONS

Shinar, "Organic Light—Emitting Devices," Springer, Oct. 2003.
Brabec, "Organic Photovoltaics: Concepts and Realizations," Springer, Jun. 2003.
Malhotra, "Handbook of Polymers in Electronics," Rapra Technology Ltd, Jul. 2002.
Joyce, et al, "Quantum Dots: Fundamentals, Applications, and Frontiers," Springer, Aug. 2005.
Bhanu et al, "Computational Algorithms for Fingerprint Recognition," Springer, Nov. 2003.
Ratha et al, "Automatic Fingerprint Recognition Systems," Springer, Oct. 2003.
Jain, "Intellighet Biometric Techniques in Fingerprint and Face Recognition," CRC, Jun. 1999.
Liu et al., A high Speed Finger-Print Optical Scanning Method, Optical Storage and Optical Information Processing (2000).
Boer and Newnes, Active Matrix Liquid Crystal Displays: Fundamentals and Applications (2005).
Bleha, W.P., et al., Application of the Liquid Crystal Light Valve to Real-Time Optical Processing, Optical Engineering, Jul.-Aug. 78/ vol. 17, No. 4. (1978).
Ratha et al., Automatic Fingerprint Recognition Systems, Springer (2003).
Bhanu et al., Computational Algorithms for Fingerprint Recognition, Springer (2003).
Axel Richter, et al., Current-Induced Light Emission from a Porous Silicon Device, IEEE Electron Device Letters, vol. 12, No. 12, pp. 691-692 (Dec. 1991).
MacDonald and Lowe, Display Systems: Design and Applications, John Wiley and Sons, Jun. 1997.
Jurgen and Fink, Electronics Engineers' Handbook, Christiansen, McGraw-Hill Professional, 1996.
Fink, Electronics Engineers' Handbook, McGraw-Hill, 1975.
Chang, Field and Wave Electromagnetics, Prentice Hall, 1989.
Malhorta, Handbook of Polymers in Electronics, Rapra Technology Ltd (2002).
Jain, Intellighet Biometric Techniques in Fingerprint and Face Recognition, CRC (1999).
Yeh and Gu, Optics of Liquid Crystal Displays, Wiley-Interscience (Sep. 1999).
Shinar, Organic Light-Emitting Devices, Springer (2003).
Kalinowski, Organic Light-Emitting Diodes: Principles, Characteristics and Processes, CRC (2004).
Brabec, Organic Photovoltaics: Concepts and Realizations, Springer (2003).
Patent Abstracts of Japan vol. 18 No. 439 (P-1787); JP, A,06 138437 (Pioneer) May 20, 1994.
Patent Abstracts of Japan vol. 1996, No. 2, Feb. 29, 1996.
Patent Abstracts of Japan vol. 1998, No. 8, Jun. 30, 1998.
Patent Abstracts of Japan vol. 1998, No. 9, Jul. 31, 1998.

Joyce et al, Quantum Dots: Fundamentals, Applications, and Frontiers, Springer (2005).

Toshiba Debuts First Full-Color 'System on Glass' (SOG) Input Display With Image Capture Technology, May 26, 2004.

Toshiba Unveils Sophisticated New Display Technologies for Mobile Computing, Cellphone and Industrial Markets, May 25, 2004 (URL: http://www.toshiba.com/taec/news/press_releases/2004/lcdb_04_213.jsp) (2004).

Osgood, Ong and Downs, Touch Screen Controller Tips, Burr-Brown Application Bulletin (2000).

Tuskada, TFT/LCD Liquid Crystal Displays Addressed by Thin-Film Transistors, CRC Press, Jun. 1996.

Chenson Chen, et al., Ultraviolet, Visible, and Infared Response of PtSi Schotty-Barrier Detectors Operated in the Front-Illuminated Mode, IEEE Transactions on Electron Devices, vol. 38, No. 5, pp. 1094-1109 (May 1991).

WO2006004981—International Preliminary Report on Patentability (1900).

* cited by examiner

ACTIVE MATRIX EMISSIVE DISPLAY AND OPTICAL SCANNER SYSTEM, METHODS AND APPLICATIONS

CROSS-REFERENCE TO RELATED APPLICATION

This application is entitled to and claims the benefit of Provisional Patent Application Ser. No. 60/797,015 filed May 1, 2006 and hereby incorporates by reference such application in its entirety.

BACKGROUND OF THE INVENTION

Low voltage emissive display (ED) technology based on organic LED (OLED), polymer LED (PLED), quantum dot, etc. offers great promise for improving display technology. EDs are beginning to appear on the market and break into the once-dominating LCD display technology for such things as portable electronic devices, computers, TVs, etc.

Currently, commercial EDs are relatively small and primarily based on passive technology, which is basically an array of overlapping conductors running in an X and Y direction. At each point of overlap between an X and Y conductor, sandwiched between the two conductors, is a layer of emissive material such that when current is driven through one X conductor and received at a Y conductor, the emissive material at the point of overlap of the two conductors illuminates due to the current flowing through it from the X to Y conductor. This is essentially a light emitting diode (LED). Efforts are continuing to manufacture larger displays for widespread use in such things as computer displays and TVs. These displays are preferably active matrix displays allowing each pixel to be individual addressed and driven rather than being addressed and driven by multiplexing (as in a passive conductor array). Advantages of active matrix displays are well known, with one of their biggest advantages being enhanced brightness.

Besides being cheaper, lighter, more flexible and consuming less power, ED technology offers other capabilities and advantages. For example, in addition to being optically emissive when electrically stimulated, many ED materials also exhibit photoelectric effect. That is, when light of sufficient energy strikes the emissive layer of the LED, there will be excitons (electron-hole pairs) created. Some of these excitons separate into their respective electrons and holes, and then each migrate to electrodes bounding the emissive layer, thus creating a potential difference between the electrodes. This potential difference or the magnitude of current flowing due to the charge migration can be sensed and gives and indication of the intensity of light illuminating the material. To improve the light detection sensitivity of the device, in many cases, it is preferable to apply a reverse bias to the LED (and in this mode, the leakage current or reverse bias resistance, which is dependent on the intensity of light striking the emissive layer, is sensed (i.e., measured)).

For example, U.S. Pat. No. 5,929,845 (incorporated herein by reference) purportedly describes a display/scanner combination based on a passive array of ED pixels where some pixels cast light while others are operable for scanning the emitted light reflected off an object to be scanned. US Patent Application Publication 2005/0231656 (incorporated herein by reference), has an image sensor having photosensitive TFT transistors in an array, but wherein the TFT devices themselves are not capable of generating or modulating light. TFT arrays are typically used to form active matrix displays. A similar device is shown in U.S. Pat. No. 6,831,710 (incorporated herein by reference). U.S. Pat. Nos. 6,947,102, 7,009,663, (both incorporated herein by reference), each show an LCD panel having light sensitivity, but wherein the light sensing element is not the light modulating portion of the pixel and is behind or off to the side of the light modulating element. U.S. Pat. No. 7,030,551 (incorporated herein by reference) purports to show a display pixel design which has an electroluminescence element as the light source and a photodiode as a light sensor, but wherein these are separate from one another and are purportedly made from different materials. See also U.S. Pat. Nos. 6,480,305, 6,404,137, 6,040,810, 5,446,564, and 4,972,252 (all of which are incorporated herein by reference) for further information on the state of the art and its progression.

Further information on ED materials and technologies can be found in *Organic Light-Emitting Diodes: Principles, Characteristics and Processes*, Kalinowski, CRC, November 2004; *Organic Light-Emitting Devices*, Shinar, Springer, October 2003; *Organic Photovoltaics: Concepts and Realizations*, Brabec, Springer, June 2003; *Handbook of Polymers in Electronics*, Malhotra, Rapra Technology Ltd, July 2002; *Quantum Dots: Fundamentals, Applications, and Frontiers*, Joyce et al, Springer, August 2005 (all of which are incorporated herein by reference).

One problem with the existing emissive display/optical scanner combination is that it is based on passive display technology, which limits its size and to some extent the brightness of the light emitting pixels (because of the need to multiplex the drivers to the pixels). The problem with existing light sensing LCD display technology is that it relies on the small (relative to the pixel size) TFT transistor to be the light sensing device and relies on ambient lighting to be the light source. The TFT transistor that receives the light for detection is susceptible to detecting internal reflections of the display's backlighting from the LCD material, and is generally not placed in an optimal position within the pixel window. Further, the optical TFT is usually beneath the LCD material and off to one side of the pixel, thus, reducing sensitivity.

The need exists for a display capable of generating and detecting light, wherein the generator and detector are preferably the same material so that the element's placement for display is also near optimal for light detection. The need also exists for such display/scanner combination that would preferably allow each pixel to operate as a light source or a light detector and, when acting as a light source, be capable of being decoupled from the display's drivers but still illuminate (i.e., be of the active matrix type). The need further exists for an active matrix-based ED display/scanner that is capable of generating light for illuminating an object to be scanned, and wherein the pixel itself (with its large window) is able to be used to detect reflected light (from an object or image being scanned) or ambient light. It would be beneficial if such a device, using the ED material itself as the light source and light detector, was capable of detecting and differentiating different wavelengths of light (such as red, green and blue for example) either by proper choice of ED materials or filtering of the light striking a pixel.

SUMMARY OF THE INVENTION

An active matrix emissive display (ED) is disclosed that also includes optical scanning capability. Each display pixel is independently addressable and independently internally driven for light generation. Each display pixel is also given the ability to be coupled to detection circuitry in order to sense currents or voltages that are optically generated or leaked by its internal LED when exposed to light (and thus acting in a photodiode capacity). Since the intensity of the light illuminating the diode determines the magnitude of generated currents and/or voltages or leakage current through the diode (when reverse biased), these sensed currents or voltages give an indication of the intensity of the light striking the pixel. In this manner, active matrix ED pixels are configured to serve the dual purpose of being able to generate and detect light. It is an object of the invention to provide active matrix ED display with its pixels configured to serve the dual purpose of generating and detecting light.

It is an object of the invention to exploit the photoelectric effect of the LED used in an active matrix emissive display pixel.

It is another object of the invention to provide an active matrix ED display capable of generating and detecting light, wherein the generator and detector are preferably the same material so that the element's placement for display is also near optimal for light detection as well as light generation.

It is another object of the invention to provide an active matrix ED display that can both generate display data and serve as a scanner.

It is another object of the invention to provide an active matrix ED display/scanner combination that would allow each pixel to operate as a light source or a light detector, and when acting as a light source, be able to be decoupled from the display's drivers but still illuminate.

It is another object of the invention to provide an active matrix-based ED display/scanner that is capable of generating light for illuminating an object to be scanned, and wherein the illuminating pixels themselves (with their large window) are able to be used to detect the reflected or ambient light.

It is another object of the invention to provide an active matrix-based ED that uses the ED material itself as the light source and light detector, and that is capable of detecting and differentiating different wavelengths of light.

It is another object of the invention to provide an active matrix ED that may be used on a portable computing device to serve not only as a display, but as a scanner.

It is another object of the invention to provide a dual-sided active matrix ED that not only displays data on both sides of its display screen, but also is operable to detect light and operate as a scanning input device from either side of the display.

It is another object of the invention to provide a portable active matrix emissive display and scanner that may be employed to scan documents and three dimensional subjects (such as, for example, fingerprint ridges).

It is another object of the invention to create a fingerprint scanner that can more readily discern between a scan of a real fingerprint and a scan of a picture or image of a fingerprint.

It is another object of the invention to provide an optically scanning active matrix display that can be used not only to display information, but also to serve as a computer input device (either with or without being used as a display) and perform similar functionality as the familiar mouse pad of modern notebook computers.

It is another object of the invention to provide an active matrix ED that is configured not only to display data, but also to optically sense light (or shadows) striking the display surface, and thereafter provide this information so that a system may carry out computing commands (such as adjusting the display in response to glare or detecting the position of a localized light or dark space as in touch panels).

It is another object of the invention to provide an optically sensing display having some or all of its pixels capable of detecting or sensing the intensity of light striking the display and automatically adjusting the brightness of the display so that it is kept at optimum viewing intensity in widely varying viewing conditions.

It is another object of the invention to provide an optically sensing display having some or all of its pixels capable of detecting or sensing the intensity of light striking the display and automatically, variably and dynamically adjust the brightness of selected parts of the display experiencing varying degrees or amounts of impinging light.

It is another object of the invention to provide an optically sensing display that is configured to sense impinging light on the display, and as a result, to extend the battery life of portable electronic devices by automatically dimming the intensity of the display in low ambient lighting conditions. It is another object of the invention to create an active matrix display capable of being an input device for a computer, cell phone, digital camera, PDA, television or other electronic device having a display.

It is another object of the invention to provide an active matrix pixel design capable of storing a voltage indicating pixel display intensity as well as being operable for being coupled to external circuitry for sensing the photoelectric effect being generated at the pixel's LED.

It is another object of the invention to create a better credit card, debit card, or smart card capable of greater security and privacy.

It is an object of the invention to provide an active matrix color display that is operable for generating color scans in that red, green and blue light light-generating pixels are also operable for sensing and scanning these colors.

It is another object of the invention to provide an optically scanning display that employs the ability to independently sensing colors to provide multiple independent input devices, such as a red, green or blue laser pointer.

It is another object of the invention to provide an optically scanning display that provides for the use of multiple, independent, optical inputs useful in video gaming operations.

It is another object of the invention to provide active matrix ED that both displays data and optically scans the external lighting environment while minimizing image-perturbation by adjusting the scanning technique so that sequential columns (or rows) are not scanned, and instead the display is scanned in a pseudo-random way or by otherwise variably scanning only selected portions of the display.

According to the various aspects of the invention, optical scanning capability is added to active matrix ED technology. Besides each pixel being independently addressable and independently internally driven for light generation, each pixel is also given the ability to be coupled to detection circuitry in order to sense currents or voltages that are optically generated by its internal LED when exposed to light (and thus acting in a photodiode capacity). Since the intensity of the light illuminating the diode determines the magnitude of generated currents and/or voltages, these sensed currents or voltages give an indication of the intensity of the light striking the pixel. Fundamentally, according to the various aspects of the invention, active matrix ED pixels are configured to serve the dual purpose of being able to generate and detect light.

According to another embodiment of the invention, the reverse leakage of a pixel's LED (i.e., its reverse resistance) diode is capable of being measured. Since this leakage current is directly proportional to the intensity of light illuminating the pixel, this measure gives an indication of this intensity.

A display/scanner combination (i.e., an optically scanning display) can be of great utility for such things as computer displays and other portable electronic devices. For example, a notebook computer screen, typically being larger than a sheet of paper, could preferably be used to not only display information to the user, but also be used for scanning standard size paper notes (such as business meeting notes, class notes, magazine pages, etc.) without the need for carrying around a separate scanning device. The combination according to the various aspects of the invention can also be used for such things as fingerprint scanning to enable secure access to devices without the need for an additional capacitive-based or optically based fingerprint scanner.

Additionally, a photosensitive display (i.e., optically scanning display) as herein disclosed can be used for displaying of information while also being operable for optically sensing light (or shadows) striking its surface. This can be used for adjusting portions of the display to ambient lighting conditions (for instance, brightening an area of the display having glare on its surface from an external source, such as the sun beaming through a window), detecting the position of a localized light source illuminating the display screen (e.g., a light pointer or light pen being used to point to the display as a mouse pointer), determining touch contact and the location of such contact with the display, etc. There are many beneficial uses enabled by the various aspects of the present invention.

The preferred embodiments of the invention presented here are described below in the drawings and detailed specification. Unless specifically noted, it is intended that the words and phrases in the specification and the claims be given the plain, ordinary and accustomed meaning to those of ordinary skill in the applicable arts. If any other special meaning is intended for any word or phrase, the specification will clearly state and define the special meaning. Likewise, if a noun, term or phrase is intended to be further characterized or specified, such will include adjectives, descriptive terms or other modifiers in accordance with the normal precepts of English grammar. Absent use of such adjectives, descriptive terms or modifiers, it is the intent the nouns, terms or phrases be given their plain and ordinary English meaning to those skilled in the applicable arts.

Further, the use of the words "function," "means" or "step" in the Specification or Description of the Drawings is not intended to indicate a desire to invoke the special provisions of 35 U.S.C. 112, Sixth Paragraph, to define the invention. To the contrary, if the provisions of 35 U.S.C. 112, Sixth Paragraph are sought to be invoked to define the inventions, the claims will specifically state the phrases "means for" or "step for," and will also clearly recite a function, without also reciting in such phrases any structure, material or act in support of the function. Thus, even when the claims recite a "means for" or "step for" performing a defined function, if the claims also recite any structure, material or acts in support of that means or step, or that perform the function, then the intention is not to invoke the provisions of 35 U.S.C. 112, Sixth Paragraph. Moreover, even if the provisions of 35 U.S.C. 112, Sixth Paragraph are invoked to define the claimed inventions, it is intended that the inventions not be limited only to the specific structure, material or acts that are described in the preferred embodiments, but in addition, include any and all structures, materials or acts that perform the claimed function as described in alternative embodiments, or that are well known present or later-developed, equivalent structures, material or acts for performing the claimed function.

BRIEF DESCRIPTIONS OF THE DRAWINGS

A more complete understanding of the present invention may be derived by referring to the detailed description when considered in connection with the following illustrative figures. In the figures, like reference numbers refer to like elements or acts throughout the figures.

FIG. 1 shows an existing pixel design based on an emissive or electroluminescent element.

FIG. 2 schematically shows a pixel design according to the various aspects of the present invention.

Figure 8:
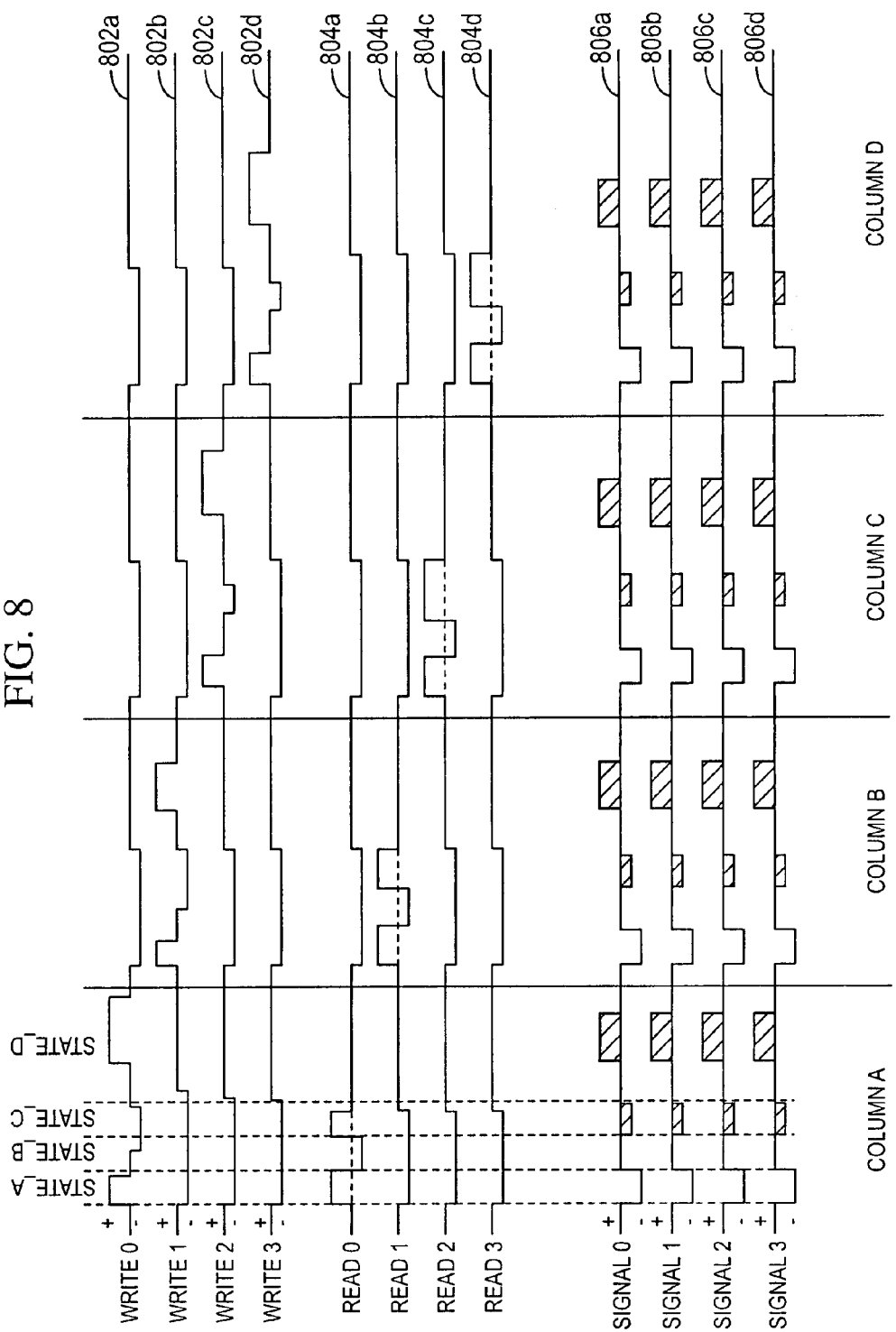

FIG. 8 displays another exemplary timing diagram of a method of operation of another embodiment of the invention.

Figure 9:
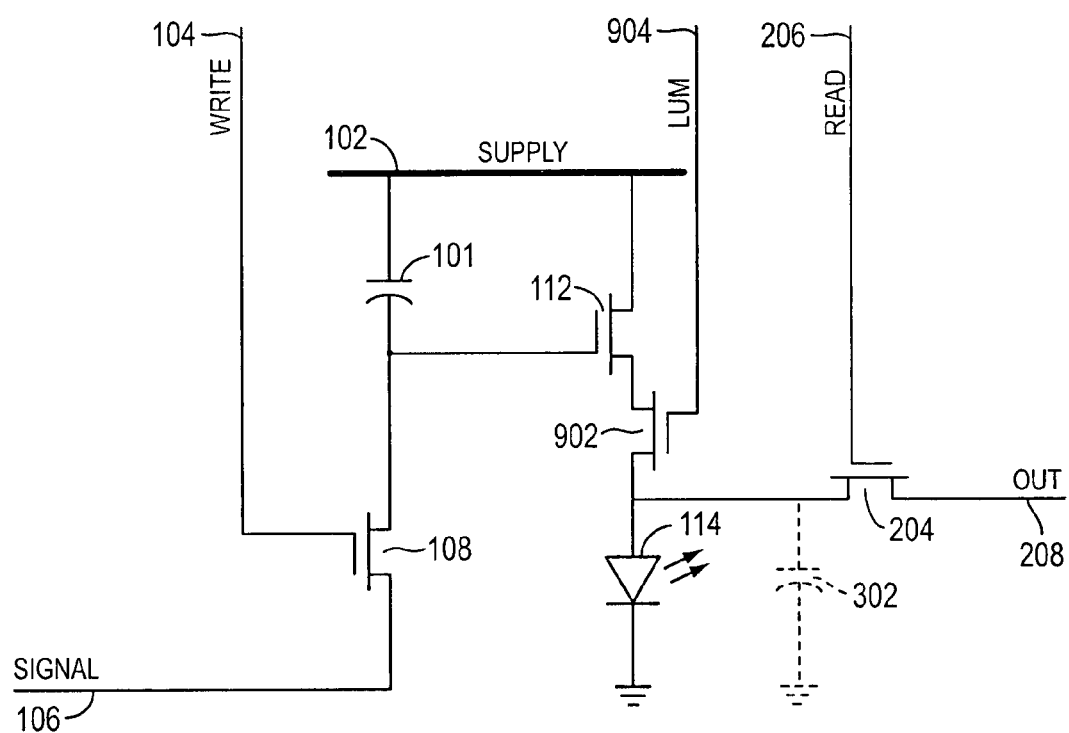

FIG. 9 shows still another embodiment of the invention according to its various aspects.

DETAILED DESCRIPTION OF EXEMPLARY PREFERRED EMBODIMENTS

In my co-pending application, "Flat Panel Display Screen Operable for Touch Position Determination", Ser. No. 11/378,205, filed Mar. 17, 2006, herein incorporated by reference, is disclosed a preferred modification to a typical ED pixel (see, e.g., FIGS. 6 and 7 of that application) which allows electrical access to the anode of a common-cathode LED in the pixel. This modification, as will be shown in greater detail below, forms a preferred basis for an active matrix ED display scanner combination.

Figure 1:
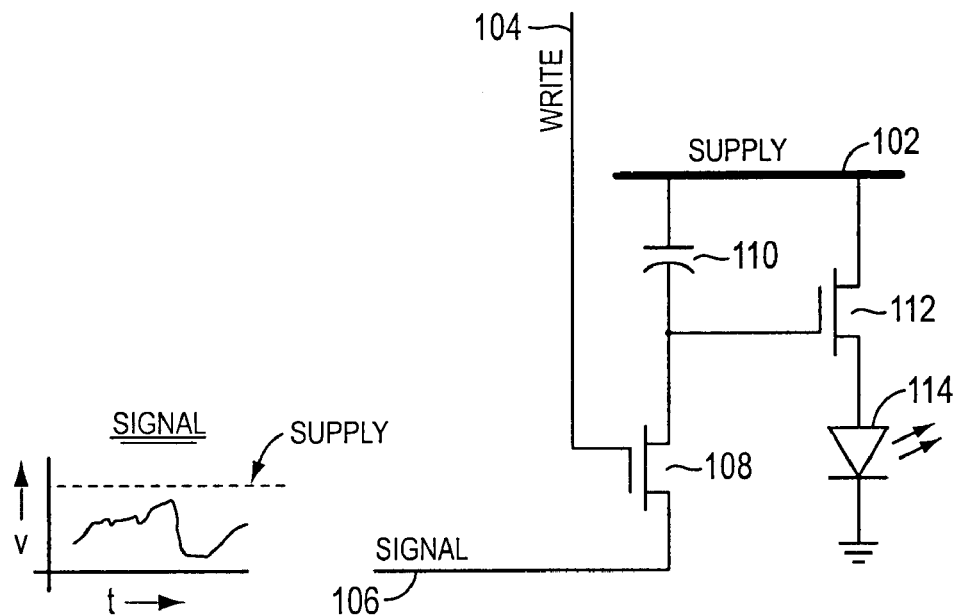

FIG. 1 shows a typical ED pixel in schematic form. This schematic is provided in a relatively simple form, and other equivalent circuits are considered within the scope of the invention. Thus, the invention may be applied to any specific form of relatively low voltage emissive display (ED) technology, including those based on organic LED (OLED), polymer LED (PLED), quantum dot, etc. Again, those skilled in the art are directed to the materials incorporated by reference above for additional details on variations in specific circuit design relating to ED technology.

The emissive layer of the light emitting diode 114 may be organic material, polymer material, etc. as is known in the art. Generally, operation begins by activating transistor 108 via write line 104. A signal corresponding to the desired brightness to be emitted by the pixel is applied to transistor 108 by signal line 106. This signal is passed by transistor 108 to capacitor 110, which is coupled to the gate of transistor 112. This, then, determines the current that will flow through LED 114 from supply rail 102. The pixel continues to illuminate after removal of the write signal owing to capacitor 110 holding a charge for biasing 112. This charge dissipates with time and so the pixel needs to be refreshed from time to time.

Figure 2:
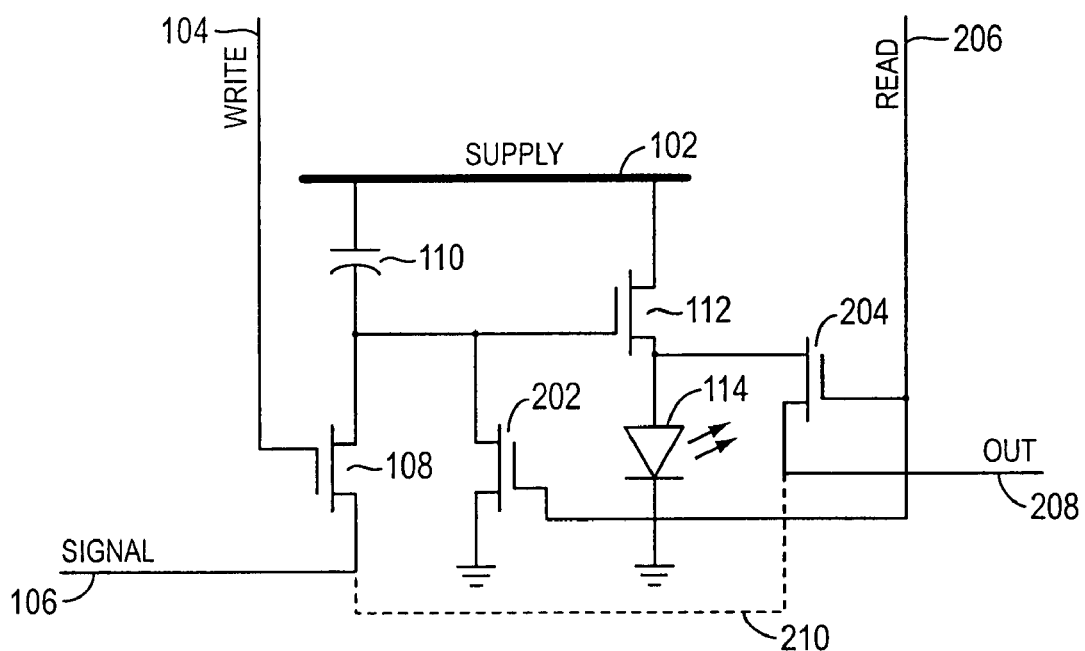

FIG. 2 shows an embodiment according to various aspects of the invention which allows for the sensing of the anode of diode 114. Thus, when READ line 206 is activated, transistor 204 is in pass mode (as is transistor 202 effectively turning off transistor 112). Thus, any voltages or currents generated or leaked by diode 114 can be sensed on OUT line 208. In a preferred modification of this embodiment of the invention, OUT line 208 is coupled to SIGNAL line 106 (shown as dashed line 210), so that SIGNAL line 106 is operable for carrying an input signal to the pixel when WRITE 104 is active and carries the OUT signal from the pixel when READ 206 is active.

Transistor 202 in FIG. 2 is preferably included to serve the purpose of turning the pixel illumination off by grounding the gate of 112 when line 202 is activated (i.e., when reading). In another embodiment (not shown), proper coordination of the lines 104 and 106 is made to serve the purpose of transistor 202, so that it may be removed from the circuit. In this case, the SIGNAL line is held near ground and write line 104 is activated. This effectively cuts off transistor 112. When OUT line 208 is not shared with SIGNAL line 106, this condition (writing 0 signal) can be done approximately contemporaneously with reading the pixel.

If capacitor 110 is expected to leak sufficient charge over the duration of the read operation in which transistor 112 may begin to turn-on, it is then preferable to write a SIGNAL value of near-ground (or other value that turns transistor 112 off) for the duration of the read operation. However, this requires that SIGNAL and OUT not be shared. Thus, a preferred design is to include transistor 202 in the pixel, so that SIGNAL and OUT may be shared. Inclusion of transistor 202 also beneficially provides for a somewhat faster read operation since simple activation of READ turns off transistor 112 and couples diode 114 to the output without requiring coordination of multiple signals (which can add time to the operation).

As was noted earlier, it is contemplated that in certain cases it is preferable to apply a negative bias to diode 114 (to increase sensitivity), and to measure or detect the reverse leakage current of the diode as an indication of the intensity of external illumination striking it. Again with reference to FIG. 2, this is accomplished by making certain modifications to the pixel depending upon the chosen implementation. If transistor 202 is included, its source is preferably connected to a voltage that is approximately that of the negative bias that will be used. This is to guarantee that transistor 112 remains cutoff while diode 114 is negatively biased. Furthermore, when not reading the pixel, the READ signal is preferably held at this negative bias potential as well to prevent transistor 202 from turning on. Similarly, whether transistor 202 is included or not, if SIGNAL and OUT are shared (i.e., optional connection 210 is made internally or externally), WRITE line 104 is also preferably held at approximately the negative bias potential when not writing, thereby preventing transistor 108 from turning on when SIGNAL/OUT is biased negatively.

In operation, the pixel operates for illumination as previously described. For a read (sense, scan, etc.) operation, the gate of transistor 112 is taken to a voltage approximately that of the negative bias that will be applied. This is done by activating the READ signal if transistor 202 is in-circuit, or by taking SIGNAL to the negative bias value and activating WRITE. OUT line 208 is also taken to the negative bias value (independently if not shared with SIGNAL or with SIGNAL if shared) and READ activated. The reverse leakage current through diode 114, the magnitude of which is dependent upon the illumination intensity striking the pixel, can now be sensed by electronics coupled to OUT (or SIGNAL if shared with OUT).

Figure 3:
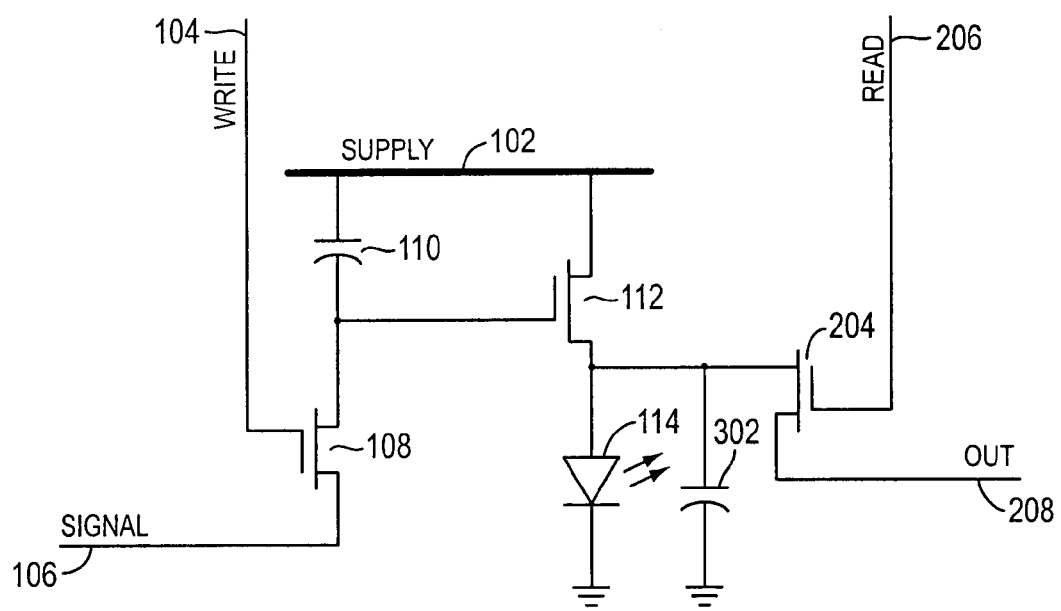
FIG. 3 depicts an alternative embodiment of the invention.

In another embodiment shown in FIG. 3, capacitor 302 is coupled in parallel with diode 114 (note that transistor 202 is excluded in this embodiment but it is contemplated that it may be included). Because the photosensitive effect (i.e., photovoltaic or photo-dependent reverse leakage current) of diode 114 can be quite weak, capacitor 302 provides a temporary 'accumulator' (i.e., integrator) and storage element for charges generated or leaked by diode 114 when transistor 112 is off. In photovoltaic operation (i.e., no reverse bias), transistor 112 is turned off as described above for other exemplary preferred embodiments. Diode 114 generates charges in the presence of illumination, which charges are stored on capacitor 302. At an appropriate time, the read signal 204 is activated, which couples capacitor 302 to out line 208 through transistor 204. This charge is then sensed by electronics coupled to line 208 as in all embodiments presented. It is also contemplated that capacitor 302 may be replaced with a quantum trap similar to that coupled to the photodiode of some CMOS image sensors that are well known in the art and operable for the same purpose.

In an alternative method of operation, transistor 112 is again turned off by methods described above (or other equivalent methods). Transistor 204 is turned on and OUT line 208 is driven to a negative potential (note that transistor 204 is turned on either by activating (taking high) the read signal, or by holding the read signal at or near ground potential and taking OUT to a negative potential). Thus, the negative bias of the OUT line is coupled to capacitor 302 which effectively negatively pre-charges 302. This in turn negatively biases diode 114. Transistor 204 may then be turned off and capacitor 302 allowed to integrate according to charges leaked by diode 114. At a later time, transistor 204 is again turned on and the charge on 302 sensed. The difference between the sensed charge and the capacitor's pre-charge level is measured and this gives an indication of the photoelectric activity of diode 114.

It is contemplated that the OUT line can be shared with the SIGNAL line as in previous exemplary embodiments when using capacitor 302 as described, with or without negative bias. It is also contemplated that, in some embodiments of the invention, it may be beneficial to include a source follower transistor (not shown) between diode 114 and transistor 204 when necessary. As those skilled in the art will appreciate, this is a design decision and choice in many instances. Typically, this will be motivated when the generating capability of diode 114 is expected to be low, and so the source follower provides impedance buffering so that a more accurate sensing of voltage/charges generated/leaked by diode 114 can be made.

It is further contemplated that the various aspects of the invention be used in an array of pixels as will be discussed below. In many large arrays, the number of electrical traces (i.e., wires) running through the array is a major factor that limits the array's pixel density. Thus, minimizing the number of required additional connections to pixels can be quite important. In yet another embodiment of the invention, no new connections to the prior art pixel are required.

Figure 5:
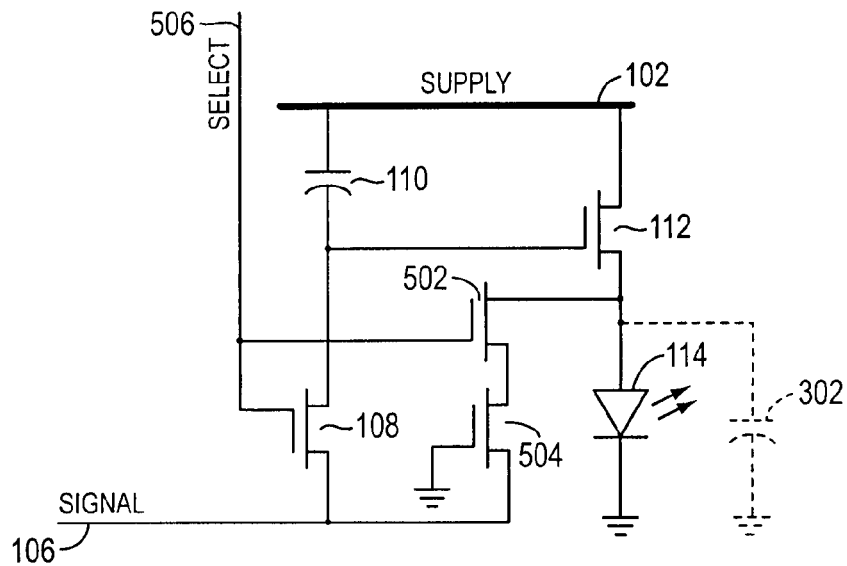
FIG. 5 shows yet another embodiment of the invention.

With reference to FIG. 5, a typical pixel circuit configuration preferably has two transistors, 502 and 504, added (and optionally, capacitor 302 as per the previously-described embodiment). By proper manipulation of the SELECT 506 and SIGNAL 106 lines, this pixel is operable for writing (i.e., illuminating) and reading (sensing or scanning). Operation of this embodiment for illuminating a pixel is performed in the standard manner. However, for sensing (reading), transistors 502 and 504 basically form a simple "AND" gate that operates as follows: When SIGNAL line 106 is taken to a negative voltage, transistor 504 is turned on. If SELECT line 104 is near ground or higher, transistors 502 and 108 will also be turned on. Thus, the pixel is turned off (through 108) from illuminating, and diode 114 is coupled to the SIGNAL line through transistors 502 and 504. In this way, the diode's reverse leakage current can be sensed (or alternatively, optional capacitor 302 is negatively pre-charged whereby operation precedes as previously described). However, if the SELECT line is taken negative along with the SIGNAL line, the pixel will continue to operate as though nothing happened. Thus, proper manipulation of the SIGNAL and SELECT lines allows the pixel to be used in illumination mode or in light sensing mode, and without any additional connects or lines to the pixel as compared to those required in the prior art.

Figure 6:
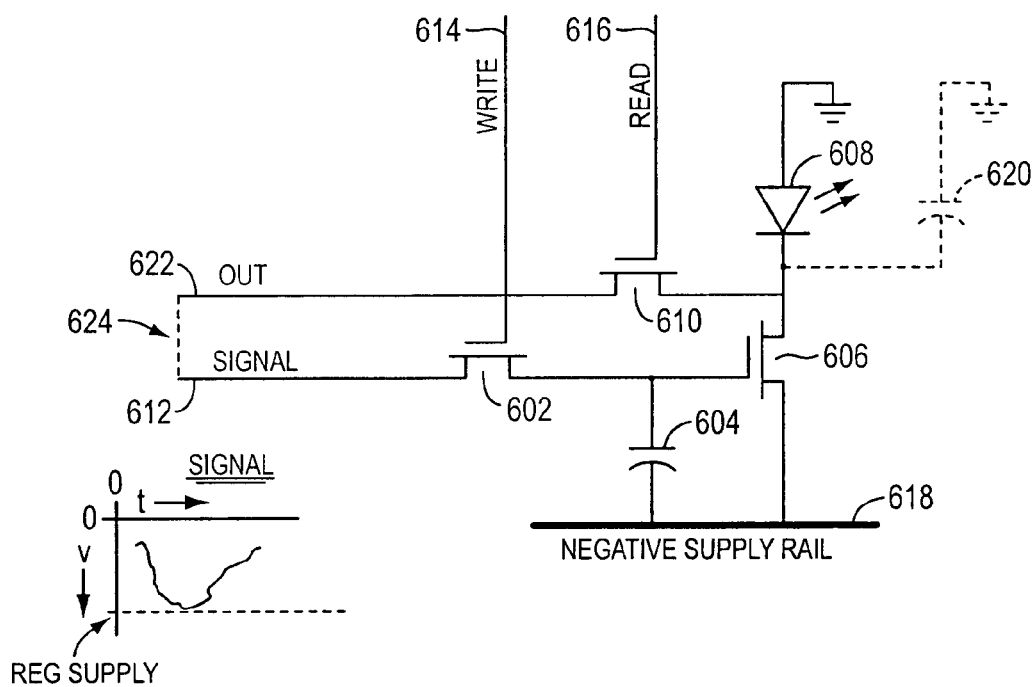
FIG. 6 shows still another embodiment of the invention.

The previous embodiments are based upon the pixel's diode being common cathode. The alternative embodiment of FIG. 6 is based on the diode being common anode. In this configuration, SIGNAL 612 ranges from a potential near zero to a potential near the negative supply rail 618, with zero volts indicating the pixel is to be fully illuminated. The pixel illuminates progressively dimmer the more negative SIGNAL 612 becomes. Thus, to illuminate the pixel at the proper intensity, WRITE line 614 is held near ground potential which turns transistor 602 on and allows SIGNAL 612 to pass through and charge capacitor 604. Capacitor 604 also biases transistor 606 to some degree of on-state, which allows current to pass through diode 608, thus creating illumination of an intensity corresponding to the amount of bias on transistor 606. This implementation of the pixel, even without the additional READ elements shown (i.e., 610, 616, optional 620), is greatly improved over the prior art.

To read (i.e., sense) the pixel, the pixel is first written so that transistor 606 is off. READ line 610 is activated by raising it to some positive voltage which turns on pass transistor 610, thus, allowing the cathode of diode 608 to be sensed. (The READ signal is off when it is held to a negative potential roughly that of the forward diode drop in magnitude.) The diode may be negatively biased by further raising OUT 622 to some positive potential.

The basic design and operation of the pixel may be modified in a manner analogous to those discussed above. For example, the SIGNAL and OUT lines can be shared as shown with optional connection 624, optional capacitor 620 may preferably be added to hold negative bias on the diode and/or to accumulate charges, etc.

For some applications (e.g., using the system and methods to both display and scan information), minimizing the illumination-off time of the pixel is of paramount importance (for example, a computer display wherein the invention is used to provide touch inputs). FIG. 9 shows an embodiment in which the transistor 112 is decoupled from diode 114 during reading. Thus, capacitor 110 does not need to have its stored charge disturbed, because transistor 112 can remain in whatever state it was in just prior to the read operation. This is owing to the fact that transistor 112 is decoupled from diode 114 during a read. As soon as the read operation (i.e., scan, sense, etc) is complete, the pixel can be immediately returned to illuminating without the need of rewriting (or refreshing) capacitor 110. Transistor 902 provides this decoupling under control of the signal present on LUM signal line 904. When LUM is activated, transistor 902 is in pass mode and the pixel is therefore in illumination mode. When LUM is deactivated, diode 114 is isolated from transistor 112 since transistor 902 is cut off and the pixel may be read. The voltage values on the LUM signal line corresponding to active and inactive illumination states depends somewhat on whether a negative bias will be applied to the pixel for the read operation as in previously described embodiments. As those in the art will appreciate, transistor 902 and the capabilities that it provides can be applied to the other embodiments herein disclosed.

Figure 4:
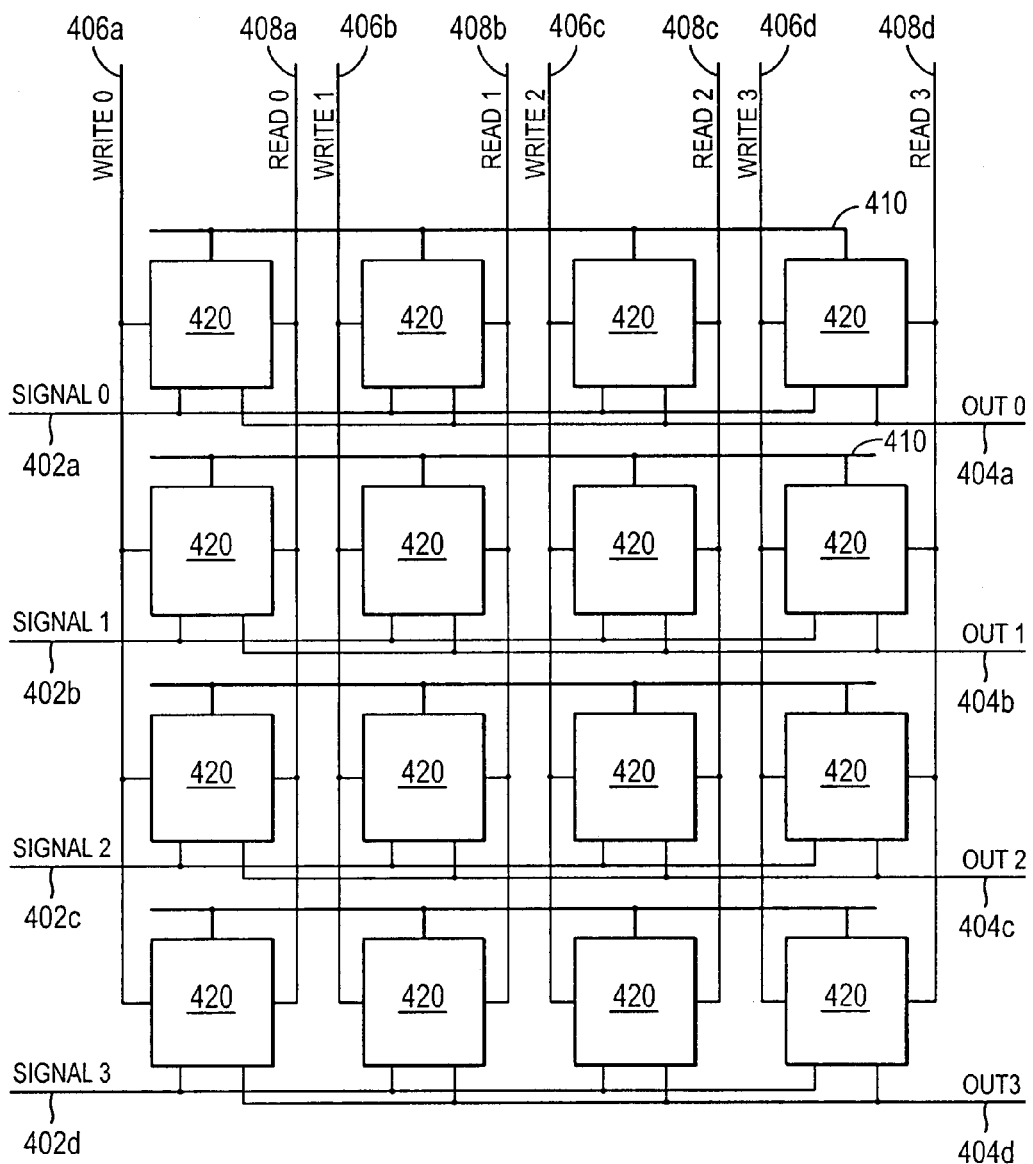
FIG. 4 shows a display made from a plurality of pixels according to various aspects of the invention.

Having described the operation of a single active matrix pixel, it will be apparent to those skilled in the art, that it is straightforward to apply the various aspects of the invention to arrays of active matrix pixels. It is important to note that in most typical active matrix arrays, the SIGNAL lines are shared among pixels (typically rows) as are the WRITE lines (typically columns), and so proper coordination of several pixels SIGNAL and WRITE lines has to be observed. For example, one such array having rows and columns is depicted in FIG. 4. It is contemplated that such an array may be monochrome or capable of color as is well known in the art, simply by designing the array so that pixels (i.e., subpixels) illuminate with the primary colors read, green or blue. (Primary colors are typically generated by filters over white LEDs or by use of optically emissive materials that emit light in the proper frequencies.) Thus, an active matrix color display modified in accordance with the various aspects of the present invention can be made operable for generating color scans in that red, green and blue light light-generating pixels are also operable for sensing and scanning these colors.

Returning to FIG. 4, an active matrix array of pixels 420 is organized as rows and columns. Each pixel 402 has connections to supply rail 410, one of the WRITE lines 406, one of the READ lines 408, one of the SIGNAL lines 402 and one of the OUT lines 404. As will be appreciated by those skilled in the art, and in accordance with previous descriptions of the various aspects of the invention, it is contemplated that lines 402 and lines 404 can be shared. For clarity of description, FIG. 4 shows these as separate lines.

Operation of the array as shown, for example in FIG. 4, is typically carried out in accordance with the descriptions offered for the various pixel embodiments, with slight modification owing to individual pixels now sharing connections with other pixels. For example, pixels not being read but sharing an OUT line preferably have their READ line taken negative if and when OUT is negatively biased to prevent those pixels' diodes from inadvertently being negatively biased (when in display mode or otherwise). Similarly, if OUT and SIGNAL are shared over the same wire, then READ and WRITE lines of neighboring pixels not being read but also connected to the shared OUT/SIGNAL line are preferably taken negative when SIGNAL/OUT is taken negative.

Turning now to a preferred method of operation of the display/scanner array of FIG. 4, display operation is basically in accordance with standard procedures, but with READ lines 408 inactive. In scanner mode, it is preferred that scans be performed column by column owing to the layout of the device of FIG. 4. However, as those skilled in the art will appreciate, other organizations of the pixels and their shared connections are contemplated, and are considered basically equivalent in function to that depicted in FIG. 4. Thus, when performing a scan, it is preferred that all pixels 420 be illuminated at full intensity to light the object to be scanned. Then a column of pixels is selected, the pixels of the selected column are turned off (by proper manipulation of SIGNAL and WRITE lines, by activating READ line, etc., depending on the pixel embodiment), the OUT lines are negatively biased (if the implementation so requires) paying proper attention to the other columns' READ and WRITE signal levels as described generally above. The READ line is then activated to couple the output of the pixels' diodes to the OUT lines.

While FIG. 4 shows that columns of pixels share common WRITE and READ lines, it is contemplated that there need not be as many pixels connected to a common READ line as there is to a common WRITE line or vice versa. For example, it may be preferred in some applications that the number of commonly selected pixels for reading be a half, a quarter, etc. that of those commonly selected for writing. This, of course, would require 2×, 4×, etc., respectively, as many READ lines as WRITE lines, but this has certain benefits for some inventive applications detailed below. (For example, this design allows fewer pixels to have their illumination stopped so that they can be scanned at any given time and thus reduce perturbing the image being displayed on a computer screen.) However, in some array embodiments, addressing techniques can be used to limit the number of pixels that will be used for sensing, even though more pixels may share connections. For example, an array comprised of pixels configured as shown in FIG. 5 can be individually addressed (i.e., singularly enabled for sensing/scanning) simply by proper manipulation of the SIGNAL and SELECT lines (e.g., a pixel at the intersection of SIGNAL being negative and SELECT being near ground or higher will be enabled for sensing and this can be as few as one pixel in the array).

Electronics (not shown), which are coupled to the OUT lines, operated to sense the diodes' outputs, either its photovoltaic effect or its reverse leakage current (i.e., its reverse bias resistance). Sensing electronics for this purpose are well known in the art and are typically used in scanning equipment, for CMOS image sensors, CCD image sensors, DRAM devices, etc. It is contemplated that only slight modification of such electronics is required for use with the invention, and such modification is well within the capability of those skilled in the art.

When scanning of one column of the array is complete, the column is preferably returned to an illuminating state. Then, the next column is turned off, and scanning progresses in this fashion, preferably column after column (though as will be shown later, in some cases, it is preferable to scan columns or pixels in pseudo-random fashion). In effect, the scan preferably sweeps across the display (and, correspondingly, scans or sweeps the thing or image in contact with the display).

The above descriptions of preferred methods of operation of the scanner/display are exemplary and for illustrative purposes only, and not to be construed as limiting. As those skilled in the art will appreciate, many variations and alterations of the described methods and systems are possible and fall within the spirit and scope of the invention.

For example, when scanning transparencies, turning pixels on for illumination may not be necessary. This is because ambient lighting shown through the transparency may provide sufficient illumination (in this case, the print or image on the transparency filters or blocks light and the scanner scans light that is not blocked). Also, ED displays need not have opaque backing and can appear somewhat transparent, thus, it is contemplated that the display/scanner may be used from both sides. Additionally, it is contemplated that not all pixels of the display/scanner need be operable for display and scanning. Also, the scanning method used, as will be appreciated by those skilled in the art, depends to large extent on the pixel implementation used to make the display/scanner device. Thus, reference is again made to the numerous exiting patents and books incorporated by reference above for design details applicable to these modifications.

Figure 7:
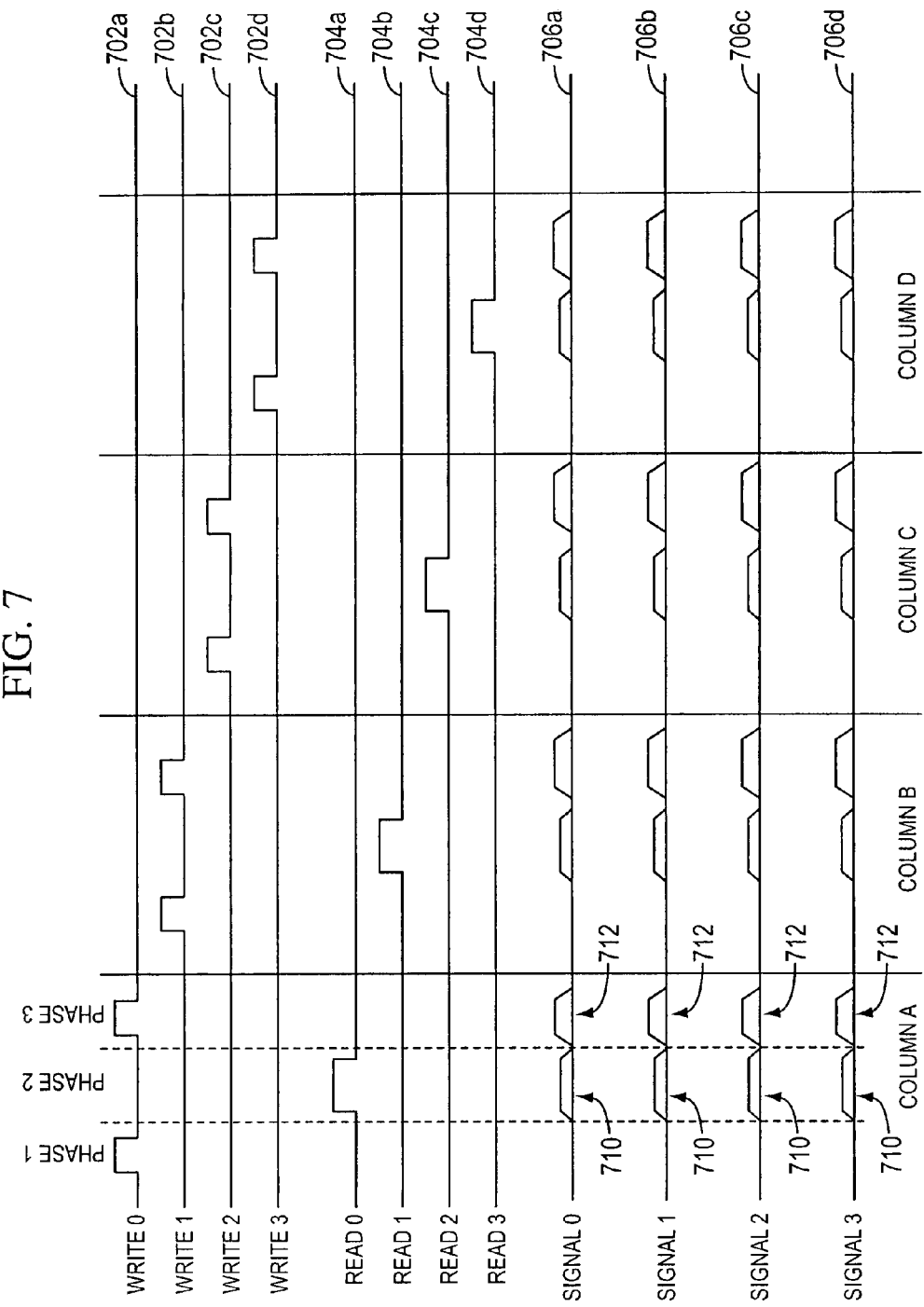
FIG. 7 depicts an exemplary timing diagram of a method of operation of the invention.

FIG. 7 and FIG. 8 show exemplary waveform diagrams applicable to a typical device of FIG. 4, comprising pixels according to FIG. 2 (not using negative bias and not having transistor 202) and FIG. 3 (using negative bias), respectively, and with sharing of the SIGNAL and OUT lines. As with all method descriptions herein, the waveform diagrams are meant to be illustrative to teach the principles of the various aspects of the invention, and are not intended to limit its scope or applicability.

With regard to FIG. 7, it will be seen that the waveform diagram shows activity for the 4 columns of FIG. 4. Each column operation is divided into 3 phases. During phase 1, the pixels of the column are turned off by raising WRITE0 (702*a*) with all SIGNAL lines 706 near 0 volts. During phase 2, READ0 (704*a*) is activated which gates the diode of each pixel to a corresponding signal line. SIGNAL value 710 is analogue and the magnitude on each SIGNAL 706 is dependent upon the intensity of photo-illumination striking the pixel. During phase 3, WRITE0 is again activated and the SIGNAL lines 706 carry an analogue signal value representative of the intensity at which the pixel should again illuminate. These 3 phases are repeated for each column when doing a full display scan.

The operation illustrated in FIG. 8 is similar in principle to the above though this time there is shown 4 states. During STATE_A, the WRITE0 (802*a*) and READ0 (804*a*) are activated. This turns the pixel off from illuminating and precharges the pixel's internal capacitor (capacitor 302 in FIG. 3) to a negative bias. During STATE_B, the capacitor just precharged is allowed to integrate the leakage current of the diode in the pixel (which is dependent on the intensity of the illumination striking the pixel). Note that STATE_B may be omitted if no integration time is desired or if the capacitor is not in-circuit. At STATE_C, the READ0 signal 804*a* is again activated and the pixels' analogue values are output (onto the SIGNAL bus). During STATE_D, the pixels are written with values indicative of their desired illumination intensity. These states are then repeated for each of the other columns. Note that during any column's operation, READ and WRITE signals 802 and 804 are taken to a negative bias value whenever SIGNAL lines 806 carry (or may carry) a negative potential.

An optically sensing display having some or all of its pixels capable of detecting, and having electronics for sensing, the intensity of external light (or light from illuminated pixels reflected off an object) striking the optically sensing display offers several benefits and capabilities. One such benefit provided is that the display can be used to optically scan the environment in which it is operating for the purposes of determining the ambient light intensity. For example, a cell phone, pda, notebook computer, mp3 player, digital camera, TV, etc having an optically sensing display preferably scans some or all of the pixels of the display to determine the intensity of the ambient light illuminating the display at the various scan points. The device then preferably automatically and dynamically adjusts the brightness of the various portions of the display in accord with this information. Beneficially, the display can be kept at optimum viewing intensity in widely varying viewing conditions and without necessitating viewer intervention.

Another contemplated beneficial capability offered by an optically scanning display is to serve as a computer input device (either with or without being used as a display), to perform similar operations as the familiar mouse pad of modern notebook computers. As a computer input device, the system has two preferred methods of operation. In a first method, the optically scanning display is operable for detecting a beam of light striking its surface and determining the approximate location of the illumination on the screen. For example, a laser pointer or other directed beam of light striking the surface of the optically scanning display will illuminate some pixels more than others. When the display is scanned, the area of this greater illumination is preferably determined. Software operable for tracking the positional changes of the area of greater illumination preferably reports these changes (or the absolute position) to the device (computer, cell phone, TV, etc) thus performing the functioning of a mouse.

It is also contemplated that adjustments may be made to the display intensity of areas of the display less than its whole. For example, a large TV having an optically sensitive display preferably senses, by the optical scanning of some or all of its pixels, that some portion of the display is being externally illuminated more than some other part (say due to a room light near the screen or glare streaming in through a window and striking part of the display). In these cases, the device is preferably operable for adjusting parts of the display to help overcome the effects of the localized illumination either by brightening those areas that were sensed as being more strongly illuminating, or dimming the parts not being so strongly illuminated. Another contemplated benefit provided by an optically sensing display is that battery life of portable electronic devices mentioned above be extended for portable electronic devices by preferably automatically and dynamically dimming the intensity of the display in low ambient lighting conditions thus conserving battery power.

Because the optically scanning display is capable of detecting colors (by being capable of independently sensing red, green and blue), an input devices according to this aspect of the invention, can be multi-user capable. For example, one user has a red laser pointer while another has a green laser pointer. The location of illumination of each upon the optically scanning display can be determined and reported. For instance, a large screen TV, computer system, etc. having a aircraft fighter video game, for example, displayed on it's screen is preferable operable for detecting these several light inputs and reporting the positions of illumination cause by the players' laser pointers to the video game. The video game uses these inputs to direct the fighter aircraft around the screen. Thus, there would be no need for the familiar game pad or other input device for directing the aircraft and the display preferably serves as an input device for each user.

It is further contemplated that an optically scanning display and/or its driver software be further operable for detecting pulses of light as mouse clicks. For example, on a computer display, a single rapid on-off pulse of light over an icon or selected item preferably serves as a left mouse click, two on-off pulse of light serve as a double mouse click, etc. Since the optically scanning display and its electronics and software is preferably operable for differentiating the color of light striking its surface, it is contemplated that on-off pulses of a different colors preferably serves as indicating different inputs. For example, a red on-off pulse is a left mouse click while a green pulse is a right mouse click or other special input, etc. In this way, pulses and colors can be combined to inform of myriad different inputs.

In the above method, the optically scanning display is operable for determining the screen-illuminating position of one or a plurality of independent light source(s). In a second preferred method, the optically scanning display is preferably operable for determining the location of an object in contact (or near contact) with the display. In this method, light from the display is reflected by an object in close proximity with the display, is detected, and its position on the display is determine. For example, a computer having an optically scanning display, displays an image and the user places an object, e.g., his finger, pencil tip, toothpick, pen, etc., on the display. The display is scanned from time to time, and light reflected from the object is detected and its position is determined. In this way, the optically scanning display serves the familiar purpose of a touch screen.

It is contemplated that the scanning software also be capable of gesture recognition well known in the mouse pad art. It is important to note that according to this aspect of the invention, the light reflected is preferably that of the image displayed without necessitating that pixels be fully illuminated, as was the preferred case for operation as an image or document scanner described earlier.

In yet another method of operation, the optically scanning display is capable of detecting and determining the location of pixels that are illuminated less than their neighbors. Thus, the optically scanning display is capable of scanning and determining the location of shadows on the screen caused by an object blocking ambient light from hitting the screen. This is useful for computer input or otherwise when the display is dark, for example, in screen saver mode of a computer.

As was mentioned above, emissive displays can be made transparent, or near transparent, and can thus be made to be viewed from both sides. Likewise, pixels, according to the various aspects of the present invention, can also be operable for detecting light from either side of the display. Thus, an optically scanning display which can display an image on both sides can also be operable as an input device from either side. For example, a clamshell cell phone preferably has a display that is viewable from the outside when closed and from the inside when open and is further operable as a touch input device from either side. Many board games such as chess, checkers, monopoly, etc. can have a "board," which is an optically scanning display, and which is designed to be placed vertically between the players. The "game board" is preferably made operable for showing the location of pieces from both sides of the display and is further operable for detecting touch inputs from either side of the 'board' by methods described above. Thus, players can move pieces from either side of the 'board' by a touch of the finger or other handy object. Such a display is contemplated for use with many video games or other computer generated adventures.

Another beneficial use of such a display is to be able to designate certain areas of the display for certain purposes. For example, the software of many existing scanners allows one to designate the size (by input of its dimensions typically) of the document or image to be scanned so that the scanner need not sweep the entire platen. It is contemplated that a user be able to trace the outline of a rectangle, circle, triangle, or other shape (regular or otherwise) with his finger or other handy object on the optically scanning display, and the system operate to recognize the tracing as marking the boundary area of an area to scan for a document or image.

Thus, preferably, the user traces a rectangle on the display with the tip of an object and the system displays this tracing by drawing a dark heavy line on the display corresponding to locations traces. Thereafter, the user places an image, say, a photograph, within the rectangle so rendered and instructs the system to scan the image. From this point, the image is preferable illuminated as described earlier by illuminating only that portion of the screen within the tracing and the image scanned as described above but preferably only within the outlined area. Preferably, all the while of scanning, the remainder of the display shows whatever image was being displayed prior to the tracing and scanning, or some other new image if desired.

Another benefit provided by a scanning optical display is to serve as a display and an optical biometric scanner, for a fingerprint, for example. Thus, a computer, cell phone, PDA, etc., can have biometric security capability without the need for a separate optically-based or capacitively-based fingerprint scanner. As an example, a user with a notebook computer equipped with an optically scanning display needs to perform a fingerprint scan. Preferably, the computer renders a rectangle on the screen and instructs the user to place his thumb in the box. Thereupon, the computer scans the box as described above to obtain a scan of the user's thumb print. This image then is input to fingerprint recognition software well known in the art. Thus, portable devices, such as cell phones or a PDA may be employed to scan fingerprints, receipts, business cards, etc. as well as display information all in the same physical area. For further information on fingerprint recognition techniques and systems, reference is made to *Computational Algorithms for Fingerprint Recognition*, Bhanu and Tan, Springer, November 2003; *Automatic Fingerprint Recognition Systems*, Ratha and Bolle, Springer, October 2003; *Intelligent Biometric Techniques in Fingerprint and Face Recognition*, Jain, CRC, June 1999, all of which are herein incorporated by reference.

Modern display resolution may not offer enough scan points for fingerprint recognition software. However, the effective display/scan resolution can be enhanced for a color display owing to the fact that each pixel actually comprises 3 subpixels (one each of red, green, and blue), each with a slightly different position on the display. Since color scanning of the finger print is not strictly necessary, a scan containing information for each of red, green, and blue subpixels preferably has each primary color normalized to a greyscale. Thus, a color display/scanner can have an effective fingerprint scanning resolution of up to 3 times that of the color display resolution. This increased resolution is contemplated to be used for other purposes besides fingerprint scanning, such as determining position of screen contact with an object or examining other objects with fine three dimensional contours.

One major objection to optically scanning a fingerprint for security purposes on cheaper devices (like computers, cell phones, etc.) is that it is very difficult for recognition software to determine whether what was scanned was the real fingerprint or a facsimile, such as a photograph or otherwise. Thus, preference has been shown for capacitive-based fingerprint scanning which requires actual contact of the finger to the scanning pad. An optically scanning display operated in accordance with the principles disclosed below can be made to solve much of the prior art objection.

The primary reason for difficulty in detecting a real fingerprint from a facsimile is due to the illumination source being fixed, thus, the 3-dimensional nature or structure of a real finger is not easily determinable. With an optically scanning display, illumination can be moved about simply by activating or brightening some pixels relative to others. Thus, the light used to illuminate the fingerprint is preferably cast from different angles onto the finger either in separate scans or as the scan progresses. This then is preferably used to detect the 3-dimensional structure of the fingerprint and used to differentiate real from fake (which is most likely 2-dimensional).

Presently preferred for this aspect of the invention is to scan the finger print in its entirety with full illumination. Next, the finger print is locally scanned with illumination originating from different areas of the display. These scans based on different illumination angles are compared for locations of light and shadow. If they differ, then the image scanned is almost certainly that of a real finger, if the scans are the same, then what was scanned was probably an image of a finger print and, thus, fake.

Another preferred method of scanning a finger print is to make use of the subpixels and primary colors generated and sensed thereby. For example, the red, green and blue subpixels are independent of one another and can be illuminated and scanned independently (and concurrently if desired). Thus, in this method, a red scan is performed concurrently with a green scan, for example, but the red and green illumination comes from different angles relative to the fingerprint. Therefore, the scans should yield the same basic fingerprint information but should have subtle variations in shading (shadows) owing to the 3-dimensional nature of a real fingerprint. These scans are preferably normalized to grey scale and compared to discover these slight variations in shading (to determine if the scan is of a real fingerprint or an image of a fingerprint) and at the same time, preferably used to generate a higher resolution grey scale scan as indicated previously.

When the display is being used for the combined purposes of display and light sensing, it is preferred to switch a pixel off (i.e., set to not illuminate) just prior to it being scanned (sensed). It is then preferred that after a pixel is scanned and sensed, that the pixel be immediately returned to displaying the intensity of light that it should to properly generate the desired image on the display. In this way, the image is perturbed minimally and persistence of the eye smoothes the effect of the pixel having gone dark momentarily, if it is seen at all.

Perturbation of the image on the display can also be further minimized by adjust the scanning technique so that sequential columns (or rows) are not scanned and instead the display is scanned in a pseudo-random way. This will further help to fool the eye. Another preferred approach to minimize display perturbation when scanning while an image is displayed on the screen is to reduce the number of pixels turned off during any scanning (i.e., read) operation. This is accomplished by increasing the number of READ lines and decreasing the number of pixels sharing read lines. If the number of READ and WRITE lines is mismatched, it is preferred that transistor 202 be included in the pixel so that manipulation of the WRITE line to turn a pixel off is not necessary.

It is also contemplated to equip a credit card with the optically scanning display described herein. In this embodiment the display is preferably operable for displaying a bar code representing account information of the card. This bar code preferably only appears as the card is typically scanned by the store's credit card scanner, which is preferably optically-based rather than magnetically-based. Additionally, the scanning optical display affixed to the credit card is then made operable for optically scanning any printed receipt that the purchaser receives, as described above. Thus, the credit card so equipped operates as a charge account wallet, capable of both carrying account information and storing receipts. A contemplated improvement to this aspect of the invention is to also require the user to allow the credit card to scan his fingerprint, according to the various aspects of the invention detailed above, prior to a purchase.

For example, a holder of the credit, debit or transaction card (basically, electronic smart cards) indicates that he wishes to purchase an item at a store. He then places his finger on the optically scanning display of the credit card and has his fingerprint scanned. The fingerprint scanned is verified and preferably, also verified as being a real fingerprint. The card is then activated for a purchase, preferably for either a fixed short amount of time (say 1 minute for example) or for a single transaction. The credit card is then placed in the store's credit card scanner whereupon a bar code appears on the credit card display that can be optically scanned by the store's credit card scanner. The purchase is thus complete and the user given his receipt which he may then cause to be scanned into his card by laying the receipt on the card's optically scanning display and triggering a scan if he so desires. It will be appreciated by those skilled in the art that the above method can have several alterations and variations.

A credit card having a fingerprint scanner offers several advantages and benefits. For example, whereby the card is activated for a transaction based on a successful scan of a valid fingerprint by the card, the transaction itself takes the place of a signature since the transaction could not have occurred without the user having pre-authorized the card's use. Furthermore, there is no requirement of transmission of biometric or other secure information in the open (optically or by radio waves) which could be eave's dropped upon by potential thieves or other illegitimates. There is no requirement that the credit card company maintain a database of biometric information. It is most natural and secure to have the card itself perform the fingerprint recognition and only work when the fingerprint is an authorized one.

It is contemplated that the disclosed system of a transaction card combined with a finger print scanner be applied to pay-to-go systems, such as the recently announced Citibank system. The 'card' of this system is basically a close-proximity (to the pay station) RF transmitter that is used to pay credit or debit based transactions. The system does not require a signature and so if the owner of the 'electronic card' loses it, there is potential for abuse of the system by one who finds or otherwise misappropriates it. Requiring that a biometric scan be made and verified by the 'electronic card' to activate the card just prior to a transaction is a highly beneficial precaution and will thwart many misuses. It is contemplated that any of the prior art methods of finger print scanning could be applied to such a device.

As those skilled in the art will appreciate, the pixel designs presented here are not exhaustive and are offered to illustrate the principles of the invention. Other active matrix pixel designs are certainly possible but the basis of each will be essentially equivalent in that these designs will at least comprise a transistor in series with an LED (for example, similar to the transistor 112 and LED 114 configuration of FIG. 1) whereby the transistor is for controlling the current through the LED. The elemental aspect of the invention is that the current drive provided to the LED through the transistor be turned off or removed (basically decoupling the LED from the rest of the pixel drive circuitry) and that the LED be selectively coupled to external circuitry for sensing, measuring or otherwise determining a optically sensitive parameter of the LED (for example, its photovoltaic output, its reverse leakage current, etc.) for the purposes of determining the intensity of external illuminating striking the pixel. It is also an elemental aspect of the invention that in some embodiments, it is beneficial to reverse bias the LED to improve sensitivity and dynamic range.

As will be further appreciated by those skilled in the art, it is contemplated that not all pixels of the displays in the above applications need have the dual capability of light detecting and display. For many applications it is quite sufficient and may be desirable that only some of the display's pixels have the capacity of both display and optical sensing. For instance, a display that is to be also used as a fingerprint scanner need only have a portion of the display area capable of scanning the fingerprint. This has the advantage that it can save money and improve manufacturer yield by confining complexity to only the physical areas of the display that require scanning capability.

What is claimed is:

1. A method of operating a display screen configured to optically scan an object placed in close proximity to the display, the display having a plurality of light emitting and sensing diodes operable as light emitters and light sensors, comprising:
   dynamically and visually indicating an area of the display screen to be scanned by enabling certain of the light emitting and sensing diodes as light emitters associated with the area; and
   producing data representative of the output levels from light emitting and sensing diodes operating as light sensors at least in the indicated area of the display screen to be scanned.

2. The method of claim 1 further comprising capturing biological image information from a biological entity that is in proximity to the scanner.

3. The method of claim 1 wherein the area of the display to be scanned is received as input from a user.

4. The method of claim 1 wherein a computer program designates the indicated area of the scanning display screen.

5. The method of claim 1, further comprising determining a user input by scanning data representative of output levels from the light sensors of the display screen, the light sensors being responsive to determine close proximity to the screen of a pointing object and tracking the pointing object's movement.

6. The method of claim 5 wherein the tracking of the of the pointing object's movement comprises repeated optical scanning of the pointing object and determining its positional change on the display from scan to scan.

7. The method of claim 1, further comprising determining an image of the object in close proximity to the indicated area of the scanning display device from the data representative of the output levels from the light sensors of the display screen.

8. The method of claim 1 wherein the indicated and scanned area changes location on the scanning display screen from time to time.

9. The method of claim 1 further comprising reverse biasing a light emitter to configure the light emitter to operate as the light sensor.

10. The method of claim 4, further comprising receiving input directing that the object be scanned.

11. The method of claim 7, further comprising storing an image of the object in the computer.

12. The method of claim 7, further comprising displaying an image of the object on the display.

13. A method of operating a device, including a display capable of emitting and sensing light, in a commercial transaction, comprising:
   indicating an area of the display screen to be optically scanned by enabling certain of the light emitters;
   performing a biometric scan on an area of the display by reading output levels from the light sensors of the display screen at least in the indicated area of the display screen to be scanned; and
   requesting authorization from a remote system to complete the transaction.

14. The method of claim 13, further comprising verifying the biometric information prior to requesting authorization for the transaction.

15. The method of claim 13, where requesting authorization from the remote system comprises displaying an optical code on the display of the device.

16. The method of claim 13, further comprising:
   scanning a receipt placed in close proximity to the display.

17. The method of claim 15 wherein the optical code comprises a bar code.

18. The method of claim 15 further comprising reading the optical code with an optical code reading device coupled to the remote system.

19. The method of claim 16 further comprising storing an image of the receipt in a memory of the device.

20. The method of claim 16 further comprising displaying the image of the receipt on the display of the device.

* * * * *